June 19, 1951     H. P. SERIO     2,557,317
COFFEE PERCOLATOR
Filed Jan. 14, 1948     2 Sheets-Sheet 1
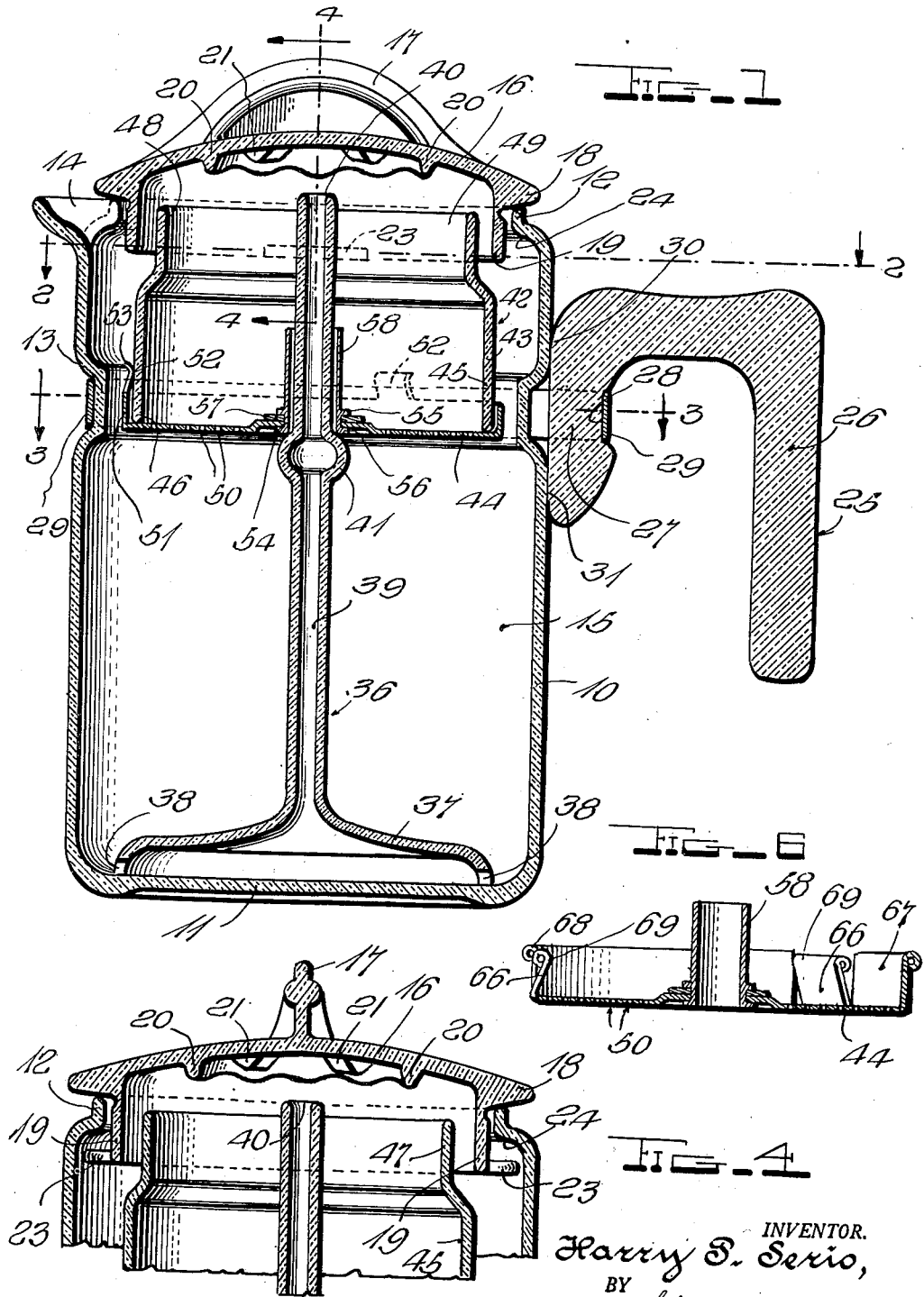
INVENTOR.
Harry P. Serio,
BY
Shoemaker & Mattare
ATTORNEYS

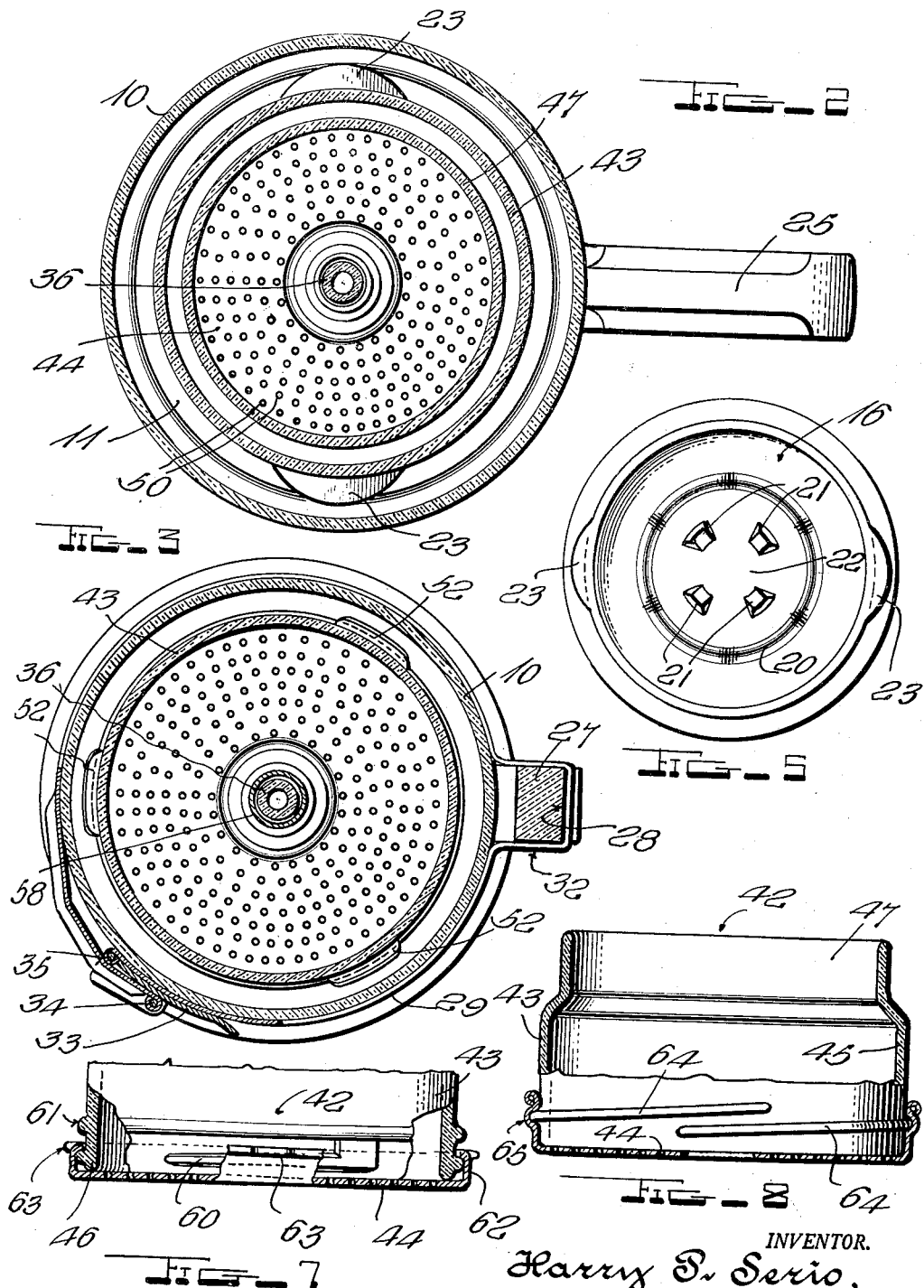

Patented June 19, 1951

2,557,317

UNITED STATES PATENT OFFICE 2,557,317

COFFEE PERCOLATOR

Harry P. Serio, Elmira, N. Y.

Application January 14, 1948, Serial No. 2,191

1 Claim. (Cl. 99—310)

This invention relates to coffee percolators.

The invention is directed more particularly to glass coffee percolators, including a novel strainer basket with a removable strainer end. The glass portions of the percolator are of Pyrex or the like and, of course, will withstand high degrees of temperature and are substantially non-breakable.

Strainer baskets for coffee percolators heretofore are of one-piece construction and a good many of them include a perforated bottom with or without the side walls of the basket being perforated, and include a central tube or sleeve on the said bottom for mounting the basket on the tubular stem of the percolator member which is supported within the percolator on the bottom thereof. Moreover, these one-piece percolator baskets have been formed of metal and include a closure which is usually perforated for the open end thereof.

The one-piece percolator baskets present quite a problem as regards emptying the used coffee grounds therefrom and washing this basket to remove the grounds that adhere to the interior bottom and side walls. It is quite difficult to keep the one-piece percolator baskets in a sanitary condition at all times.

In my glass percolator wherein a two-piece percolator basket construction is utilized, the body portion of the basket is of glass and the perforated strainer bottom is preferably of metal and detachable from the body portion. The glass body portion is especially formed so that it will maintain the coffee grounds therein without providing a cover therefor, which cover is necessary in the old type of percolator baskets. This two-piece construction of percolator basket, when used in a glass percolator container, allows the view of the interior of the percolator during the course of brewing the coffee. The coffee, during the brewing process, may be observed through the glass of the container and the percolator basket, both of which are transparent, and, of course, this is an advantage in determining whether the actual brewing effect is accomplished and the coffee properly brewed. The two-piece construction wherein the bottom of the percolator basket is readily and quickly detachable from the glass body of the basket is such that the coffee grounds within the basket may readily be emptied almost in their entirety and the basket as a whole can be maintained in a completely sanitary condition at all times and during the course of brewing the possibility of the coffee grounds overflowing into the percolator proper is prevented due to the particular construction of the glass percolator basket body, as described hereinafter in detail.

With the foregoing in mind, it is an object of my invention to provide a coffee percolator constructed substantially of glass, which glass is preferably transparent and embodying therewith a strainer basket the body portion of which is glass and preferably transparent and a perforated strainer bottom closure which is readily detachable from the said body.

Another object of my invention is to provide a percolator strainer basket consisting of only two parts which are the body proper and a detachable strainer bottom, and a readily detachable connection between the two said parts.

Another object of my invention is to provide a percolator strainer basket the body portion of which is of glass and the perforated strainer bottom detachable closure being of metal.

Another object of my invention is to provide a percolator strainer basket the body portion of which is glass and including an upper portion of reduced dimensions relative to the lower portion to the end of which is detachably secured a perforated metallic strainer bottom or closure.

Another object of my invention is to provide a strainer basket for percolators including a perforated strainer bottom closure and having an open end, and the body portion thereof being of reduced dimensions at its upper end relative to the lower end thereof so as to prevent coffee grounds from overflowing into the percolator receptacle proper.

Another object of my invention is to provide a two-piece percolator strainer basket wherein the bottom strainer detachable closure is readily removable and which closure includes means to secure the same to one end of the percolator basket and which means may assume several different forms or modifications.

With the above and other objects in view, the invention consists in the construction and novel combination and arrangement of parts hereinafter fully described, illustrated in the accompanying drawings and pointed out in the claim hereto appended, it being understood that various changes in the form, proportions, and minor details of construction, within the scope of the claim, may be resorted to without departing from the spirit of sacrificing any of the advantages of the invention.

In the drawings, wherein the same numerals appearing in the several figures denote the same parts:

Fig. 1 is a vertical longitudinal sectional view of the percolator including the percolator basket;

Fig. 2 is a longitudinal sectional view substantially on the line 2—2 of Fig. 1 looking in the direction of the arrow;

Fig. 3 is a longitudinal sectional view on the line 3—3 of Fig. 1 looking in the direction of the arrow;

Fig. 4 is a fragmentary vertical sectional view taken substantially on the line 4—4 of Fig. 1;

Fig. 5 is a bottom plan view of the percolator top or closure;

Fig. 6 is a vertical sectional view of a modification of the bottom perforated closure for the percolator basket;

Fig. 7 is a further modification in side elevation with parts in section of said perforated strainer closure for the percolator basket; and Fig. 8 is a still further modification in side elevation with parts in section of the said perforated strainer closure for the percolator basket.

The invention will be more readily understood by referring to the drawings in detail. The percolator container proper 10, preferably of glass and which is of generally cylindrical formation, includes an integral bottom 11, an open top 12, a circumferential reduced portion or groove 13 disposed adjacent the open top 12, and a pouring lip 14. The entire interior 15 of the percolator is, of course, hollow. A glass cover or closure 16 includes a grip web portion 17 on its exterior and a laterally extending flange 18 which rests on the open end of the percolator body 15, and a circumferential depending flange 19 which extends within the top or open end portion of the percolator. Beneath the grip portion 17 there is provided a fluted circumferential depending rib 20 within which there are formed four spaced projections 21 providing within the same an area 22 against which and said projections and the rib the percolated coffee is discharged. The percolator cover 16 is provided with two diametrically opposed laterally extending tongues 23 which are disposed at a right angle with respect to the web grip 17 and which tongues are integral with the depending flange 19. These tongues 23 provide for detachable engagement of the cover 16 with the open end of the percolator container. The manner of engaging the closure 16 with the percolator is that the web 17 is gripped by the finger and one of the tongues is first engaged under the shoulder 24 adjacent the open end of the percolator, and the other oppositely disposed tongue is then dropped down into the cut away portion which is the spout 14, and then, by rotating the closure so that the said one tongue is not in alignment with the spout 14, both of the tongues will be beneath the shoulder 24 and the closure will be prevented from accidental disassociation from the percolator. In order to remove the closure the reverse is accomplished by aligning one of the tongues with the spout opening 14 and then simply raising up the cover at an angle and withdrawing the other tongue from beneath the shoulder 24 within the percolator.

Any suitable handle may be provided for the percolator. I have shown a substantially U-shaped handle 25 having a grip portion 26 which is spaced from the wall of the percolator and an attaching arm 27 having a groove 28 therein which serves to position a metal band 29, which band is disposed within the circumferential groove 13 in the percolator container. This band grips the arm 27 of the handle closely against the portions 30 and 31 of the percolator container which are adjacent, that is, above and below the circumferential groove 13. The metal band 29 is looped at 32 so as to extend around the sides of the securing arm 27 of the handle and a portion thereof rests in the groove 28 in the said handle portion. There is a conventional toggle lever pivoted catch member 33, including pivots 34 and 35, attached to the respective ends of the metal band by means of which this band is contracted within the circumferential groove 13 to secure the handle to the percolator and expanded, if it is desired to remove the handle therefrom.

A glass percolator member, generally denoted at 36, includes an enlarged substantially circular bottom 37 provided with a plurality of spaced notches 38 which allow the liquid within the percolator to pass therethrough upwardly into the hollow stem 39 which is open at its free end 40 and intermediate of its ends is provided with an enlarged bulbous formation 41 which acts as a support for the percolator basket, presently to be described.

The percolator basket is denoted generally at 42 and includes a body section 43 and a removable or detachable bottom 44. The percolator body is preferably made of glass and the main portion thereof 45, the end of which 46 is open, is of a diameter greater than the upper portion 47 thereof, this being accomplished by the step formation 48. The upper section 47 of the percolator basket is open at its end 49. The enlarged bottom portion of the glass percolator basket is closed by the strainer bottom 44, which bottom or closure is preferably of metal and includes a plurality of perforations or openings 50 and a circular flange 51 which flange is provided with a plurality of spaced spring fingers 52 at its upper edge, which fingers are bent inwardly adjacent their ends and the outer ends 53 thereof are bent outwardly so as to allow the percolator bottom to be readily slid on the open end of the glass percolator basket body and to be firmly held thereon.

The bottom of the percolator basket is provided with an opening 54 into which by means of flanges 55 and 56 and a washer 57 one end of the tubular sleeve 58 is secured. The dimensions of the sleeve 58 are such with respect to the hollow percolator tube 39 that it can be slipped over the open end 40 of said tube and when associated with the glass percolator basket it forms a guide means and a centralizing means whereby the percolator basket as a whole is centrally positioned within the percolator adjacent the upper end thereof and rests on and is supported by the bulbous or enlarged formation 41.

It will be seen from Figs. 1 through 5, as described above, that when the percolator basket, the body portion of which is of glass and the strainer lower portion thereof being of metal, are detachably associated with each other and mounted on the hollow stem 39 of the percolator and resting on the support 41, the open end of the percolator stem extends through the percolator basket sleeve 58 and the extreme end of this tube is immediately below but spaced from the spaced projections 21, the fluted depending ring 22, and assuming that coffee has been placed within the percolator basket and water within the percolator container and heated to a sufficient degree, percolation will start within the fluid in the container, passing up through the hollow glass tube 39 and out of the open end 40 and be ejected against the area 22 and the projections 21 and the depending ring 20 and, of course, will be directed by said depending ring back into the percolator basket so that the percolated fluid or liquid seeps through the coffee in the basket and back into the percolator proper and this process is continued until the coffee is properly brewed.

As to the modification of the invention depicted in Fig. 6, instead of providing the tongues 52 extending above the upper edge of the flange, as shown in Fig. 1, a plurality of spaced spring tongues 66 are integral with the flange 67 and are disposed within the general plane of said flange. The tongues 66 are formed by merely slitting the flange 67. The free ends 68 of the tongues are turned outwardly and provide a rounded portion 69 which is adapted to firmly engage the side walls of the glass percolator basket 42 and to secure together the strainer bottom and the glass percolator basket body.

In the modification of the invention as depicted in Fig. 7 the glass body portion 43 of the percolator strainer is shown and adjacent the open lower end 46 thereof there are provided integral with the glass body a plurality of spaced or interrupted inclined or cam locking ribs or threads 60 on the periphery thereof and, if desired, a circumferential stop bead 61. A flange 62 of the detachable percolator basket bottom is provided with a plurality of spaced projections 63 which correspond to the number of interrupted threads 60. The percolator basket bottom 44 is thus detachably secured to the glass percolator basket 43 by simply arranging the projections 63 in the spaces of the interrupted cam threads 60 and pushing the bottom upwardly and rotating the same clockwise, thus the projections 63 will ride on the cam interrupted threads 60 and firmly secure the detachable perforated percolator basket bottom 44 to the end of the glass percolator basket 43.

In the modification shown in Fig. 8, the percolator basket 43 is provided at its lower end with preferably one continuous overlapped end thread 64 which projects outwardly from the periphery of the basket and is preferably formed integral therewith. The perforated metal bottom or closure 44 for the glass basket is provided with a rolled thread 65 which, of course, corresponds in contour and shape with the thread 64 and thus allows a firm threaded connection of the metal percolator basket bottom with the glass body portion thereof.

In both of the modifications of Fig. 7 and Fig. 8 it is clear that the metal strainer bottom of the percolator basket is readily associated with and detachable from the glass percolator basket proper, very much in the same manner that the spring tongues 52 allow for ready connection and disassociation of the metal bottom of the percolator basket with the glass percolator basket body.

In all forms of the invention, particularly with regard to the percolator basket structure, it is clear that the matter of emptying the used coffee grounds therefrom is quite readily and expeditiously accomplished and similarly this basket, due to its novel two-piece detachable construction, may be at all times kept in an extremely sanitary condition.

I claim:

A coffee percolator including a glass container of cylindrical formation open at its upper end with the upper end portion of its side wall constricted except for a pouring lip portion thereof, said container having adjacent its upper end a constricted cylindrical narrow inwardly projecting portion providing a circumferential groove to receive a handle attaching band, a cover for the container having a laterally extending flange resting upon the open upper constricted end of the container, a vertically extending glass percolator tube within the container having an enlarged base resting upon the bottom of the container and said tube having an enlarged annular portion adjacent its upper end substantially level with the lower end of said cylindrical inwardly projecting portion of the container, a coffee basket including a cylindrical glass body part, an integral cylindrical short neck portion at the upper end of the body part of less diameter than the diameter of the body part with an intermediate inwardly and upwardly inclined shoulder portion, the neck portion being of a height much less than the height of the body part, said cylindrical body part being completely open at its lower end, the bottom opening of the body part being coextensive with the inner cylindrical wall thereof, a metal strainer member having a perforated bottom plate portion extending over the lower end of the body part, and said strainer having an upstanding annular flange fitting over the end of the body part, the flange having at a plurality of spaced points thereabout portions thereof of substantially the same height as the height of the flange bent inwardly therefrom and forming spring fingers engaging the outer wall of the body part and detachably connecting the strainer member thereto, the bottom of the strainer member being provided with a central opening and a short sleeve extending upwardly therefrom in telescoping engagement with the percolator tube, said coffee basket being supported on the annular enlargement of the percolator tube with the top of its neck portion disposed near the level of the top of the container and its lower portion disposed opposite and adjacent said constricted inwardly projecting cylindrical portion of the container, the upper end of the percolator tube projecting above the top of said neck portion adjacent the underside of the cover, and a flange depending from the cover and extending between the constricted upper end of the container wall and the neck of the coffee basket.

HARRY P. SERIO.

REFERENCES CITED

The following references are of record in the file of this patent:

UNITED STATES PATENTS

| Number | Name | Date |
|---|---|---|
| 1,056,049 | Nelson | Mar. 18, 1913 |
| 1,899,451 | Bates | Feb. 28, 1933 |
| 2,204,158 | Serio et al. | June 11, 1940 |
| 2,283,734 | Hoffled et al. | May 19, 1942 |
| 2,334,752 | Clapp et al. | Nov. 23, 1943 |